US012632745B2

(12) United States Patent
Tucker

(10) Patent No.: US 12,632,745 B2
(45) Date of Patent: May 19, 2026

(54) COMPUTER-IMPLEMENTED SYSTEM AND METHOD FOR BUILDING CONTEXT MODELS IN REAL TIME

(71) Applicant: Genesee Valley Innovations, LLC, Santa Clara, CA (US)

(72) Inventor: Simon Tucker, Oakland, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 751 days.

(21) Appl. No.: 17/952,978

(22) Filed: Sep. 26, 2022

(65) Prior Publication Data

US 2023/0017581 A1 Jan. 19, 2023

Related U.S. Application Data

(63) Continuation of application No. 15/233,881, filed on Aug. 10, 2016, now Pat. No. 11,455,545.

(51) Int. Cl.
| | |
|---|---|
| *G06F 7/00* | (2006.01) |
| *G06F 17/00* | (2019.01) |
| *G06N 5/022* | (2023.01) |
| *G06N 5/025* | (2023.01) |
| *G06Q 10/0639* | (2023.01) |
| *G06Q 30/0201* | (2023.01) |
| *G06Q 30/0202* | (2023.01) |

(52) U.S. Cl.
CPC ............. *G06N 5/022* (2013.01); *G06N 5/025* (2013.01); *G06Q 10/0639* (2013.01); *G06Q 30/0201* (2013.01); *G06Q 30/0202* (2013.01)

(58) Field of Classification Search
CPC .... G06N 5/022; G06N 5/025; G06Q 10/0639; G06Q 30/0201; G06Q 30/0202

USPC .......................................................... 706/52
See application file for complete search history.

(56) References Cited

U.S. PATENT DOCUMENTS

| | | | |
|---|---|---|---|
| 7,139,757 B1 | 11/2006 | Apollonsky et al. |
| 8,001,512 B1 | 8/2011 | White |
| 8,055,546 B1 | 11/2011 | Cassone et al. |
| 8,209,331 B1 | 6/2012 | Garg et al. |

(Continued)

OTHER PUBLICATIONS

Otebolaku, A.M. et al. (2014). "Context-Aware Media Recommendations." 2014 28th International Conference on Advanced Information Networking and Applications Workshops. IEEE. DOI:10.1109/WAINA.2014.40 (Year: 2014).

(Continued)

*Primary Examiner* — Pavan Mamillapalli
(74) *Attorney, Agent, or Firm* — Krista A. Wittman

(57) ABSTRACT

A computer-implemented system and method for building context models in real time is provided. A contextual situation of a user is determined and compared with models each associated with actions that represent a situation. A determination is made that none of the models represents the situation of the user. A similarity value is determined for each of at least a portion of the models with the situation of the user. A threshold is applied to the similarity values. All models associated with a similarity value that satisfies the threshold are selected. The selected models are merged into a new model for the situation by utilizing a weight associated with each of the selected models to identify those actions in the selected models for inclusion in the new model.

20 Claims, 5 Drawing Sheets

(56) References Cited

U.S. PATENT DOCUMENTS

| 9,218,819 | B1 | 12/2015 | Stekkelpak et al. | |
|---|---|---|---|---|
| 9,372,555 | B2 | 6/2016 | Abbott et al. | |
| 10,096,055 | B2 | 10/2018 | Ryu et al. | |
| 11,080,336 | B2 | 8/2021 | Van Dusen | |
| 11,455,545 | B2 * | 9/2022 | Tucker | G06N 5/025 |
| 2006/0010206 | A1 * | 1/2006 | Apacible | G06F 15/163 |
| | | | | 709/205 |
| 2006/0287920 | A1 | 12/2006 | Perkins et al. | |
| 2008/0228685 | A1 | 9/2008 | Shivaji-Rao et al. | |
| 2009/0141940 | A1 | 6/2009 | Zhao | |
| 2009/0186635 | A1 | 7/2009 | Vieri | |
| 2009/0210373 | A1 | 8/2009 | Yu et al. | |
| 2011/0125678 | A1 * | 5/2011 | Partridge | G06Q 30/0631 |
| | | | | 706/54 |
| 2011/0301777 | A1 | 12/2011 | Cox et al. | |
| 2012/0108172 | A1 | 5/2012 | Bullen | |
| 2012/0150874 | A1 | 6/2012 | Sweeney et al. | |
| 2013/0054512 | A1 * | 2/2013 | Ephrat | G06F 16/254 |
| | | | | 707/602 |
| 2013/0238535 | A1 | 9/2013 | Eppanen et al. | |
| 2013/0268767 | A1 | 10/2013 | Schrecker | |
| 2013/0311924 | A1 * | 11/2013 | Denker | G06F 16/3349 |
| | | | | 715/771 |
| 2014/0032572 | A1 | 1/2014 | Eustice et al. | |
| 2014/0055610 | A1 | 2/2014 | Ko et al. | |
| 2014/0129560 | A1 | 5/2014 | Grokop et al. | |
| 2014/0229498 | A1 | 8/2014 | Dillon et al. | |
| 2014/0280138 | A1 | 9/2014 | Li et al. | |
| 2014/0297248 | A1 | 10/2014 | Li et al. | |
| 2015/0058320 | A1 | 2/2015 | Zheng et al. | |
| 2015/0170033 | A1 | 6/2015 | Rhee et al. | |
| 2015/0317582 | A1 | 11/2015 | Nath et al. | |
| 2016/0062985 | A1 | 3/2016 | Epstein et al. | |
| 2016/0065519 | A1 | 3/2016 | Waltermann | |
| 2016/0099970 | A1 | 4/2016 | Grodzicki | |
| 2016/0109861 | A1 | 4/2016 | Kim et al. | |
| 2016/0300049 | A1 | 10/2016 | Guedalia | |
| 2016/0357774 | A1 | 12/2016 | Gauci et al. | |
| 2016/0360382 | A1 | 12/2016 | Gross et al. | |
| 2016/0371591 | A1 | 12/2016 | Reddy et al. | |
| 2017/0032263 | A1 | 2/2017 | Yuan et al. | |
| 2017/0039305 | A1 | 2/2017 | Shakarian et al. | |
| 2017/0048664 | A1 | 2/2017 | Zhang | |
| 2017/0169715 | A1 | 6/2017 | Alyuz Civitci et al. | |
| 2018/0046922 | A1 * | 2/2018 | Tucker | G06N 5/022 |
| 2018/0292797 | A1 | 10/2018 | Lamparter et al. | |
| 2023/0017581 | A1 * | 1/2023 | Tucker | G06N 5/025 |
| 2023/0306284 | A1 * | 9/2023 | Tappin | G06F 16/248 |
| 2024/0037417 | A1 * | 2/2024 | Cheng | G06N 5/022 |
| 2024/0241752 | A1 * | 7/2024 | Crabtree | G06Q 10/067 |

OTHER PUBLICATIONS

Reichardt, D. (Sep. 1995). "A Real-Time Approach to Traffic Situation Representation From Image Processing Data." Proceedings of the Intelligent Vehicles '95. Symposium. IEEE. DOI:10.1109/IVS.1995.528332 (Year: 1995).

Bouneffouf, D. et al. (2012). "Following the User's Interests in Mobile Context-Aware Recommender Systems: The Hybrid-and-Greedy Algortihm." 2012 26th International Conference on Advanced Information Networking and Applications Workshops. pp. 657-662. DOI 10.1109/WAINA.2012.200 (Year: 2012).

Gross, T. et al. (2004). "Modelling Shared Contexts in Cooperative Environments: Concept, Implementation, and Evaluation." Computer Supported Cooperative Work 13: 283-303, 2004. (Year: 2004).

Adomavicius, G. et al. (2005). "Incorporating Contextual Information in Recommender Systems Using a Multidimentional Approach." ACM Transactions on Information Systems, vol. 23, No. 1, Jan. 2005, pp. 103-145. (Year: 2005).

Kundu, S. et al. (2012). "A Ubiquitous Image Tagging System Using User Context." 2012 IEEE/WIC/ACM International Conferences on Web Intelligence and Intelligent Agent Technology. IEEE. DOI:10.1109/WI-IAT.2012.249 (Year: 2012).

O'Reilly, R.C. et al. (2014). "Goal-Driven Congnition in the Brain: a Computational Framework." arXiv:1404.7591v1 [q-bio.NC] (Year: 2014).

Bailey, C. et al. (2002). "Link augmentation: a context-based approach to support adaptive hypermedia." Workshop on adaptive hypermedia. Springer, Berlin, Heldelberg, Aug. 2001j. OHS/SC/AH 2001, LNCX 2266, pp. 239-251, 2002. (Year: 2002).

Vasudevan, C. (1994). "An experience-based approach to software project management." Proceedings Sixth International Conference on Tools with Artifiical Intelligence. TAI 94. IEEE. Nov. 1994. DOI:10.1109/TAI.1994.346435 (Year: 1994).

Rao, A.S.P. et al. (2011). "Secured Agile Architecture for Context Aware Pervasive Computing". (IJCSIT) International Journal of Computer Science and Information Technologies. vol. 2(2), 2011, 711-716. ISSN:0975-9646 (Year: 2011).

Zurn. J.B. et al. (2012). "Self-reproduction for articulated behaviors with dual humanoid robots using on-line decision tree classification. " Robotica 30.2 (2012): 315-332. doi:10.1017/S0263574711000580 (Year: 2012).

Alhamid, M.F. et al. (2015). "Towards context-aware media recommendation based on social tagging." J Intell Inf Syst (2016) 46: 499-516. DOI 10.1007/s10844-015-0364-5 (Year: 2015).

Segev, A. et al. (2009). "Context-Based Matching and Ranking of Web Services for Composition." IEEE Transactions on Services Computing, vol. 2, No. 3, Jul.-Sep. 2009. (Year: 2009).

* cited by examiner

COMPUTER-IMPLEMENTED SYSTEM AND METHOD FOR BUILDING CONTEXT MODELS IN REAL TIME

FIELD

This application relates in general to determining context, and in particular to a computer-implemented system and method for building context models in real time.

BACKGROUND

Understanding customer routines in particular situations can help businesses anticipate the needs of their customers. Specifically, the ability to anticipate a customer's needs allows businesses to provide personalized recommendations, which can help businesses increase revenue, as well as customer satisfaction and customer base. For instance, a customer that tends to grocery shop for produce first and meat next, can be provided with produce specials upon entering a grocery store since information or coupons provided at a relevant time are more useful than when provided at other times.

Generally, each customer routine can be represented by a model for the specific situation. Thus, for the shopping example, the situation of the customer can be identified as entering ABC Grocery store. A search for a model associated with ABC Grocery store is conducted for the user. If found, the model is used to help anticipate the user's next action or movement with respect to the store. However, if no model is identified for the situation, recommendations for the customer can be based on other users associated with ABC Grocery store, randomly provided, or no recommendations are sent. Further, if a model doesn't exist for the identified situation, building a new model requires time to collect actions performed by the user during the situation and thus, cannot be used. Failing to provide recommendations or providing general recommendations, rather than customized recommendations, at random times can result in a loss of potential opportunities to increase revenue and customer satisfaction.

Therefore, there is a need for an approach to generating models for new situations in real time. Preferably, the approach will merge models from similar situations to identify recommendations for a user in a new situation across a number of different dimensions, not currently considered.

SUMMARY

Conventionally, context models are used to represent user routines and provide relevant information to a user based on the associated context. However, in situations for which no context model exists, information is generally less accurate due to commonly being provided to the user randomly or based on a population related to the user. To ensure that information or recommendations provided to a user are contextually relevant to the new situation, a new model can be generated in real time. The new model can be generated by identifying the new situation, identifying models representing situations related to the new situation, and merging the identified models. Subsequently, information or actions can be selected from the merged model and provided to the user as a recommendation that is contextually relevant to the new situation.

An embodiment provides a computer-implemented system and method for building context models in real time. A database of models for a user is maintained. Each model represents a contextual situation and includes one or more actions. Contextual data is collected for the user and a contextual situation is identified for that user based on the collected contextual information. Models related to the identified situation are selected and merged. One or more actions from the merged model are then selected.

A further embodiment provides a computer-implemented system and method for building context models in real time. A contextual situation of a user is determined and compared with models each associated with actions that represent a situation. A determination is made that none of the models represents the situation of the user. A similarity value is determined for each of at least a portion of the models with the situation of the user. A threshold is applied to the similarity values. All models associated with a similarity value that satisfies the threshold are selected. The selected models are merged into a new model for the situation by utilizing a weight associated with each of the selected models to identify those actions in the selected models for inclusion in the new model.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Providing useful information to a user at relevant times can increase revenue and customer satisfaction for a business. However, using conventional methods, a model must first be established for each user situation or scenario to be able to identify and provide useful recommendations. Unfortunately, if no model exists for a particular contextual situation, identifying helpful information for the user is difficult and often inaccurate due to relying on routines of a related population or providing information randomly. To ensure that user specific data is provided and relied upon in unknown contextual situations, models for related situations can be identified and merged to identify information or actions relevant to the individual, which can be provided as a recommendation.

Figure 1:
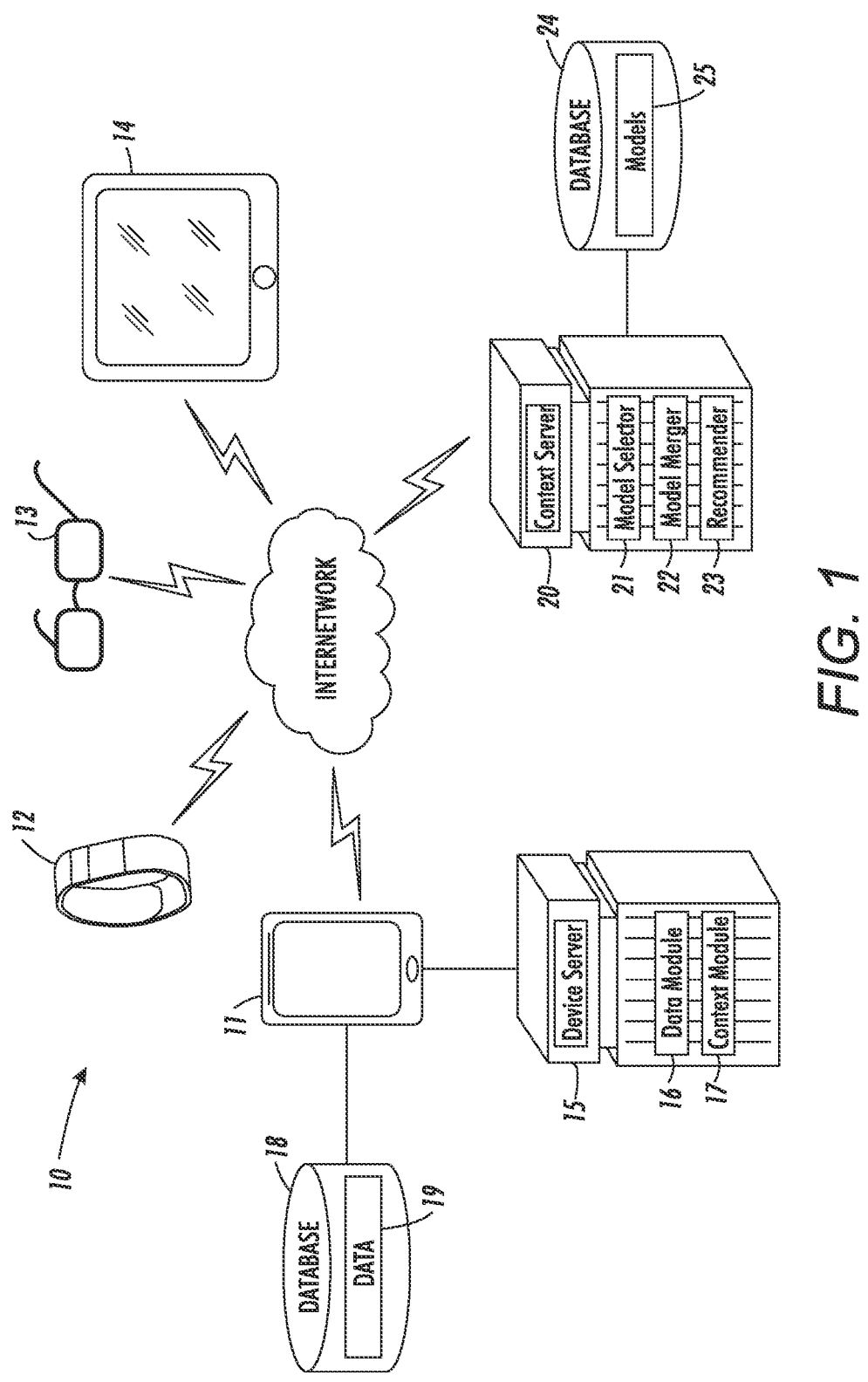
FIG. 1 is a block diagram showing a computer-implemented system for building context models in real time, in accordance with one embodiment.

Merging models for related contextual situations can provide actions or information relevant to a new contextual situation experienced by a user. FIG. 1 is a block diagram showing a computer-implemented system 10 for building context models in real time, in accordance with one embodiment. An individual user is associated with one or more mobile computing devices, including a cell phone 11, smart watch 12, head-mounted computing device 13, such as Google Glass manufactured by Google Inc., and tablet 14. However, other types of mobile computing devices are possible. Each of the computing devices 11-14 can collect contextual data 19 for the user, including one or more of location, time, temperature, acceleration, vital statistics, movement tracking, inventory, and other types of data related to the user's current surroundings. The contextual data 19 can be collected via sensors or sound or video recording devices within the mobile computing devices 11-14. For example, contextual data 19 can include a location of the user, which is obtained via GPS on a smart phone, a location of the user with respect to a particular piece of equipment, as identified via Bluetooth, time collected from a clock on the smart phone, and a video of the user obtained via a camera, such as on the mobile headset.

Once collected, the contextual data 19 can be stored in a database 18 associated with each mobile computing device 11-14. Each mobile computing device 11-14 can also be associated with a device server 15, which includes a data module 16 and a context module 17. The data module 16 accesses the contextual data 19 from the database 18 for processing. The contextual data 19 collected by each device can then be transmitted to a single mobile computing device for processing via the context module 17 associated with that device to determine a contextual situation of the user. However, in a further embodiment, each mobile computing device 11-14 can transmit the contextual data 19 to a context server 20, via an internetwork 27, such as the Internet, for identifying the contextual situation based on the contextual data 19. The contextual situation can be identified using a combination of activity recognition and semantic modeling, or based directly on one or more items of contextual data.

Upon determining a current contextual situation, a context model 25 can be selected for the situation. However, if the situation is new and no model exists, the context server 20 can generate a new model in real time. The context server 20 includes a model selector 21, a model merger 22, and a recommender 23. The model selector 21 identifies existing models 25 for contextual situations that are related to the new identified situation. The existing models 25 can be stored in a database 24 interconnected to the context server 20. The model merger 22 then merges the models of the related contextual situations into a single model, which can be assigned to represent the new contextual situation. Finally, the recommender 23 can identify one or more actions from the merged model for recommending to the user for performance with respect to the new situation.

The mobile computing devices 11-14 and servers 15, 20 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
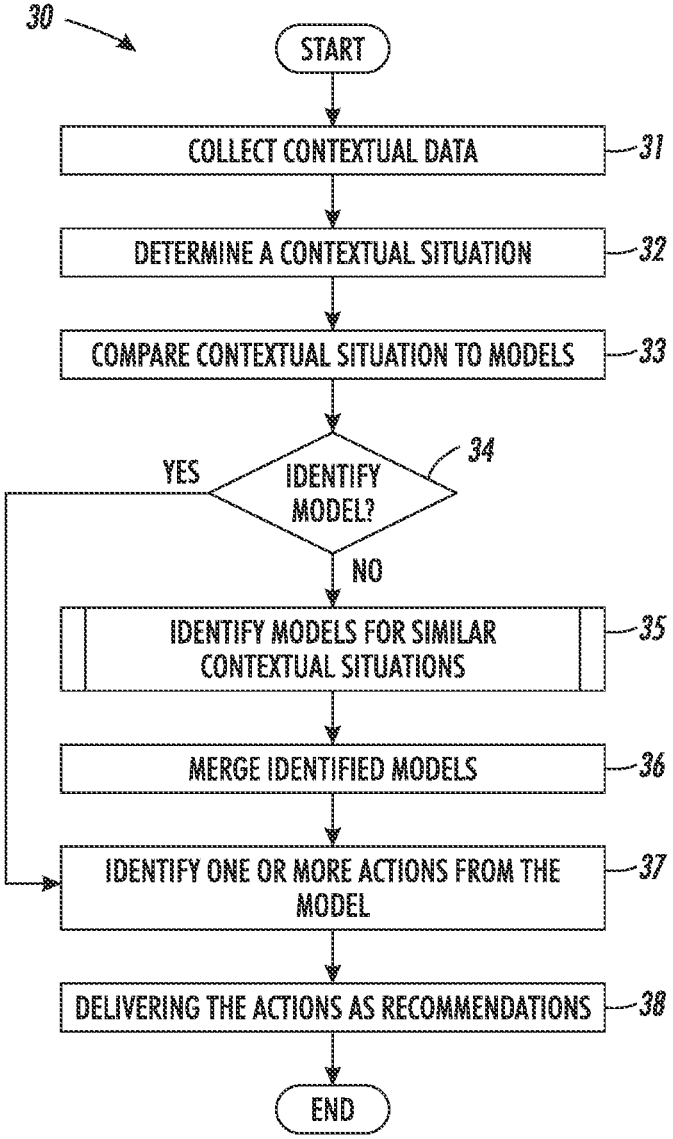
FIG. 2 is a flow diagram showing a computer-implemented method for building context models in real time, in accordance with one embodiment.

Model merging allows models for a new contextual situation to be generated in real-time to provide users with information and recommendations relevant to the new contextual situation. FIG. 2 is a flow diagram showing a computer-implemented method 30 for building context models in real time, in accordance with one embodiment. Contextual data is collected (block 31) for a user. The contextual data can include location, time, vital statistics, acceleration and movement data, email, text messages, video, and voice recordings. Other types of contextual data are possible. The contextual data can be collected continuously, periodically, or randomly.

Next, at least a portion of the contextual data can be used to determine (block 32) a contextual situation. For instance, coordinates determined by GPS can be used to identify the contextual situation as one that is occurring at a location associated with the coordinates. In one example, a user's location identifies his presence at Northgate Mall in Seattle, Washington. In another example, time and date can be used to determine a contextual situation, such as by determining a time for a user experiencing a contextual situation. For instance, on a Monday night at 8 p.m., the user routinely goes attends Spanish class. Also, vital statistics and acceleration can be used to identify a contextual situation in which the user is running, which can be determined based on a level of acceleration and heart rate. Other contextual situations can be determined based on the same or different items of contextual data.

Once determined, the current contextual situation can be compared (block 33) with a set of existing context models, which each represent a contextual situation and common actions performed by the user with respect to that contextual situation. If a model is identified (block 34), one or more actions can be selected (block 37) from the model and provided (block 38) to the user as a recommendation. Additionally, or alternatively, further actions can be identified from the actions in the model and provided to the user.

Figure 3:
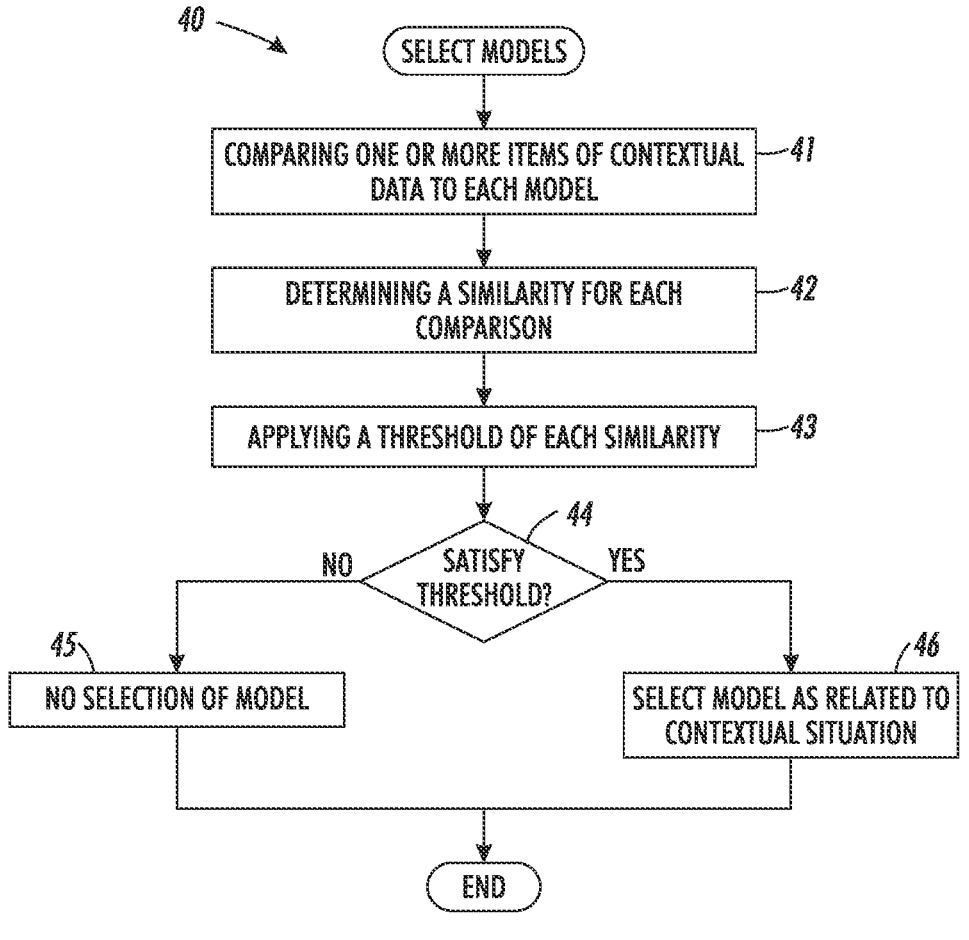
FIG. 3 is a flow diagram showing, by way of example, a process for selecting similar context models.

However, if no model is identified (block 34) for the current contextual situation, the contextual situation is identified as new and two or more of the existing models for similar contextual situations are identified (block 35). FIG. 3 is a flow diagram showing, by way of example, a process 40 for selecting models for similar contextual situations. One or more items of contextual data collected for a new situation is compared (block 41) to each existing model for previous contextual situations. A similarity value for each comparison is determined (block 42) and in one embodiment, a threshold is applied (block 43) to each similarity value. If a similarity value fails to satisfy (block 44) the threshold, the model associated with the similarity value is not selected (block 45) as representative of a previous contextual situation that is similar to the current contextual situation. However, if the similarity value satisfies (block 44) the threshold, the model for the previous contextual situation is selected (block 46) as similar to the current contextual situation.

Returning to the discussion with respect to FIG. 2, once identified, the models of the similar contextual situations are merged (block 36) to generate a new model for the new contextual situation. In one embodiment, merging of the models can occur by combining the actions of the similar contextual situations. Specifically, if the actions for each contextual situation are stored in a table, the tables for the similar contextual situations can be combined to generate a single table representative of the new contextual situation. Each of the tables can be represented as a graph, such as with nodes and edges, as further described below with reference to FIGS. 4 and 5.

The combined table can then be used to identify those actions most popular or consistent across all of the merged models, as well as to generate a single display. For instance, in one example, each action in a model can be associated with a significance value, such as a popularity value or probability of occurrence. Upon combining the tables of the similar contextual situations, values for the same or related actions can be combined by adding the popularity values, or by determining a mean or median value. In a further embodiment, each of the similar contextual models can be associated with a weight, which may carry over to each action in that model, and the weights are considered upon merging of the models, including when adding the significance values, or determining a mean or median value. Other methods for merging the models are possible.

Using the merged model, one or more actions can be directly selected (block 37) from the model for providing (block 38) to the user as recommendations or helpful information. Additionally, another action or information, related to the actions in the model, can be selected (block 37) for providing with the recommendation. The actions selected can be those most consistently performed by the user during the associated contextual situation.

Figure 4:
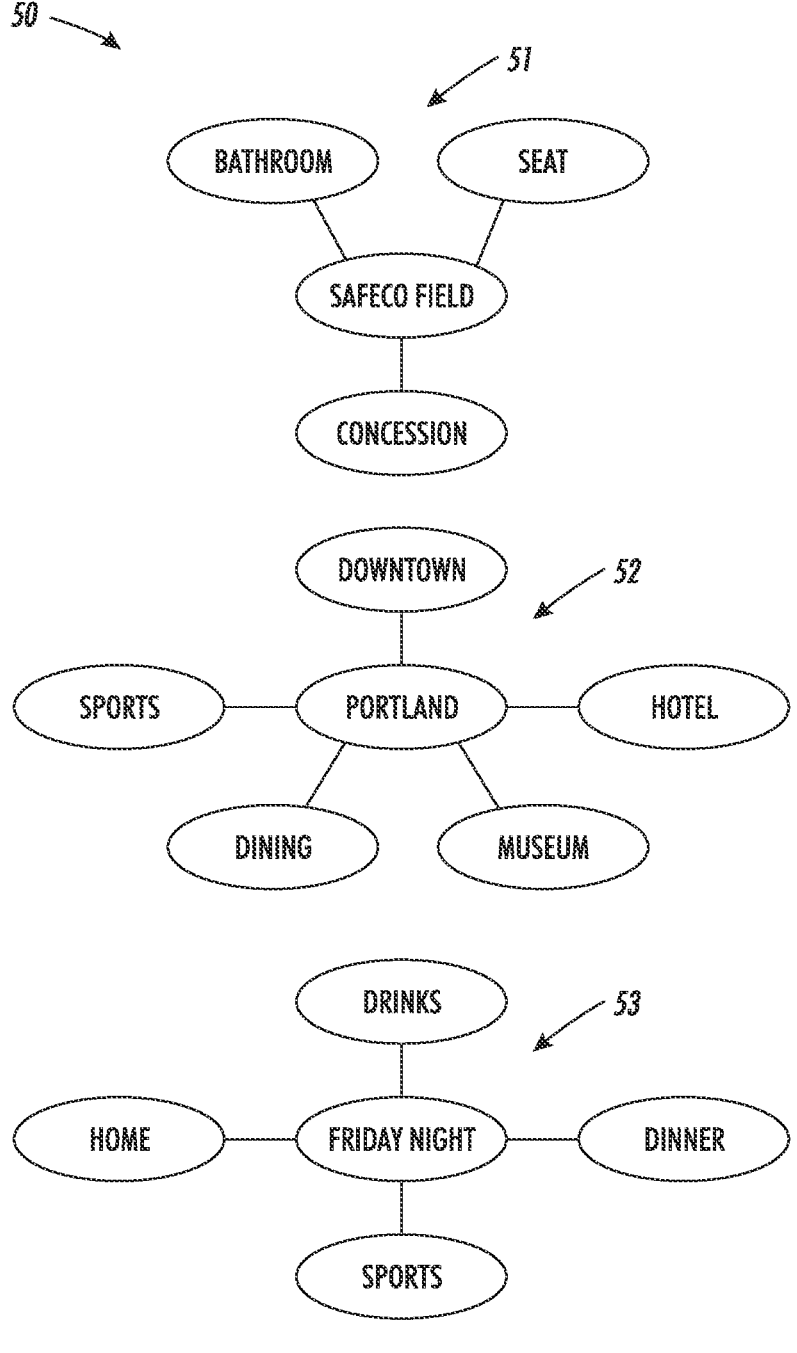
FIG. 4 is a graphical representation showing, by way of example, context models for similar contextual situations.

In one example, a user is determined to be at the Moda Center in Portland, Oregon to watch a Portland Trailblazers basketball game on a Friday night. Identification of the contextual situation can occur based on the contextual data collected, including location coordinates, time, date, and event schedule. A search for a model representing a contextual situation at the Moda Center, such as for a basketball game, is conducted, but no model is identified. Accordingly, a search for models of similar contextual situations is conducted and three models are identified. However, other numbers of identified models are possible. FIG. 4 is a graphical representation showing, by way of example, models 50 for similar contextual situations. In this example, the contextual situations similar to the Moda Center are identified as attendance at a Seahawks game at CenturyLink Field 51 in Seattle, Washington, Friday night activities 53, and Portland, Oregon 52.

The football game at CenturyLink Field model 51 includes actions, such as using the bathroom, locating and sitting in an assigned seat, and obtaining concessions. Each of the actions can be associated with metadata providing additional detail of the actions, such as purchasing a beer and a hotdog at the concession stand. Alternatively, the metadata can be included in the model itself, such as via a hierarchical graph. For instance, the purchase of the hotdog and beer can be represented as nodes extending from the concession node. The Portland, Oregon model 52 includes actions for visiting downtown Portland, staying in a hotel, visiting a museum, dining at one or more restaurants, and attending a sports event. The Friday night model 53 includes actions for having drinks, eating dinner, attending sports events, and staying at home.

Each of the actions provided for each model are actions that have been performed by the user over time with respect to each contextual situation. In one embodiment, the number of actions associated with each model can be limited to remove actions that are unlikely to occur again for that contextual situation. The actions can be limited by time, frequency of occurrence, or a combination of time and frequency. For instance, using a combination of frequency and time, the user may have attended a ballet performance once on a Friday night three years ago, but has not since attend a single ballet performance. Thus, as more frequent activities are performed and more time passes, the less frequent activities that occurred longer ago can be removed.

Figure 5:
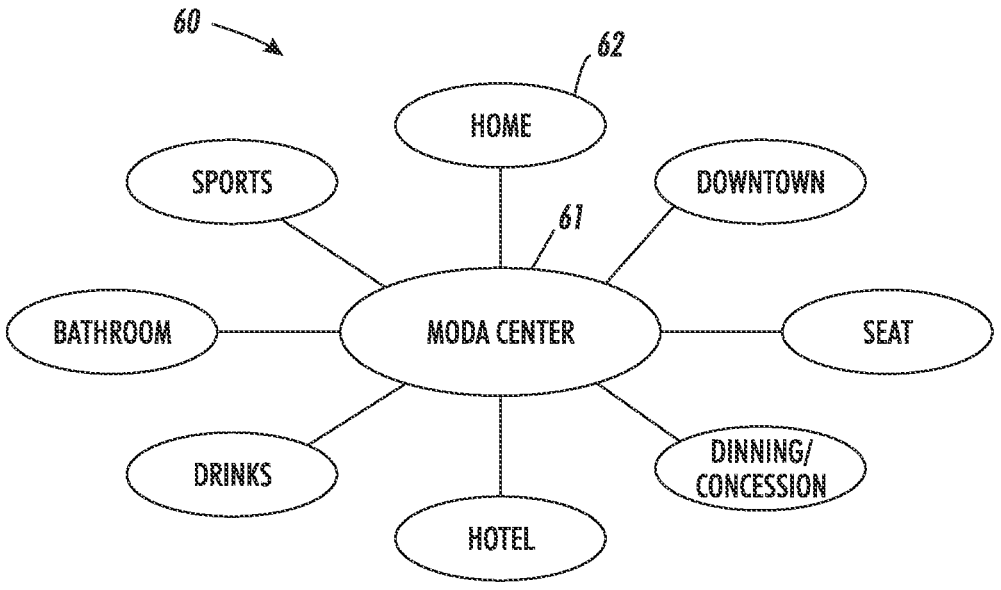
FIG. 5 is a graphical representation showing, by way of example, a merged context model for a new contextual situation.

Once identified, the models for each of the similar contextual situations identified are merged to generate a new model representing the new contextual situation. FIG. 5 is a graphical representation showing, by way of example, a merged model 60 for a new contextual situation 51. The merged model 60 includes actions 62 from each of the models for the similar contextual situations. Each of the actions can be associated with a significance value, such as a popularity value or probability of occurrence to identify the most consistent actions, which will have a highest significance value. As described above, when the models of the similar contextual situations are merged, the significance values for the same or related actions can be combined by adding the significance values, or determining a mean or median value.

Returning to the above example regarding the Moda Center, the models for the similar contextual situations of football at CenturyLink Field, Friday night, and Portland, Oregon are merged to generate a model for the Moda Center since this is the first time that the user has attended an event at the Moda Center. During merging, the same or related actions are combined, such as by adding the significance values for those actions, or determining a mean or median value. Also, those actions unrelated to any other action in the similar models can be listed in the merged model. In a further embodiment, a threshold can be applied to the significance value of each action, including individual actions or merged actions. If satisfied, the action can be included in the new model for the new contextual situation. However, if not satisfied, the action is not included in the new model.

Actions most consistently performed or most popular across the merged model, as determined by their significance values, can then be identified for providing to the user for the current situation, which is new. For instance, when the user enters the Moda Center, a recommendation can be delivered to the user to take a left to get to a concession stand to buy a hot dog and a soda before proceeding to his seat. This recommendation can be based on the actions of the merged model, which identifies obtaining food as having a high significance value across each of the merged models and thus, is a highly consistent action.

As described above with reference to FIG. 4, each of the three identified models for similar contextual situations includes eating. The football CenturyLink Field model 51 includes concessions, the Friday night model 53 includes dinner and drinks, and the Portland, Oregon model 52 includes dining. The recommendation for hot dogs and beer can be identified based on prior actions of the user at similar contextual situations during which the user purchased beer and hot dogs. Further, the directions to the concession stand can be determined via a map of the Moda Center. The recommendation can also include other types of external data, such as a menu for the concession stand, food and drink costs, other restaurants or concessions, weather, game statistics, and game schedule. Other types of external data for recommendations are possible.

In a further embodiment, the context models built in real time can be used to dynamically generate documents for providing to a user based on that user's particular level of knowledge or context, as described in further detail in commonly-owned U.S. patent application Ser. No. 15/233,861, entitled "Computer-Implemented System and Method For Dynamically Generating Documents Based on User Context", filed on Aug. 10, 2016, the disclosure of which is incorporated by reference.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for building context models in real time, comprising:
   a database of models for a user, wherein each model comprises actions that represent a different situation;
   a server comprising a central processing unit, memory, an input port to receive the models from the database, and an output port, wherein the central processing unit is configured to:
   determine a contextual situation of a user;
   compare the situation with models each comprising actions that represent a different situation;
   determine that none of the models represents the situation of the user;
   determine a similarity value for each of at least a portion of the models with the situation of the user;
   apply a threshold to the similarity values;
   select all models associated with a similarity value that satisfies the threshold;
   generate a new model for the situation, to add to the database, by utilizing a weight associated with each of the selected models that carries over to the actions in that model to identify those actions in the selected models for inclusion in the new model; and
   select one or more of the actions of the new model for recommended performance by the user.

2. A system according to claim 1, wherein the central processing unit collects the contextual data of the user to determine the situation.

3. A system according to claim 2, wherein the contextual data is collected via one or more of a cell phone, smart watch, head mounted computing device, and tablet.

4. A system according to claim 2, wherein the contextual data comprises one or more of location, time, temperature, acceleration, vital statistics, inventory, movement data, email, text messages, video, and voice recordings.

5. A system according to claim 2, wherein the contextual data is collected continuously, periodically, or randomly.

6. A system according to claim 1, wherein the central processing unit recommends during the situation the selected actions from the new model to the user.

7. A system according to claim 6, wherein the central processing unit selects the actions for recommendation by identifying those actions as most popular or most consistently performed across all the merged models.

8. A system according to claim 6, wherein the weight of each table is considered for each action in that table for selecting the one or more actions for recommendation.

9. A system according to claim 1, wherein the central processing unit stores the actions of each model in a different table and combines the actions of the new model into a single table.

10. A system according to claim 9, wherein the central processing unit represents each table of actions as nodes and edges.

11. A computer-implemented method for building context models in real time, comprising:
   determining a contextual situation of a user;
   comparing the situation with models each comprising actions that represent a different situation;
   determining that none of the models represents the situation of the user;
   determining a similarity value for each of at least a portion of the models with the situation of the user;
   applying a threshold to the similarity values;
   selecting all models associated with a similarity value that satisfies the threshold;
   generating a new model for the situation, to add to the database, by utilizing a weight associated with each of the selected models that carries over to the actions in that model to identify those actions in the selected models for inclusion in the new model; and
   selecting one or more of the actions of the new model for recommended performance by the user.

12. A method according to claim 11, further comprising:
   collecting the contextual data of the user to determine the situation.

13. A method according to claim 12, wherein the contextual data is collected via one or more of a cell phone, smart watch, head mounted computing device, and tablet.

14. A method according to claim 12, wherein the contextual data comprises one or more of location, time, temperature, acceleration, vital statistics, inventory, movement data, email, text messages, video, and voice recordings.

15. A method according to claim 12, wherein the contextual data is collected continuously, periodically, or randomly.

16. A method according to claim 11, further comprising:
   recommending during the situation the selected actions from the new model to the user.

17. A method according to claim 16, wherein the selected actions are identified as most popular or most consistently performed across all the selected models.

18. A method according to claim 16, wherein the weight of each model is considered for each action in that table for selecting the one or more actions for recommendation.

19. A method according to claim 11, further comprising:
   storing the actions of each model in a different table; and
   combining the actions of the new model into a single table.

20. A method according to claim 19, further comprising:
   representing each table of actions as nodes and edges.

* * * * *